UNITED STATES PATENT OFFICE.

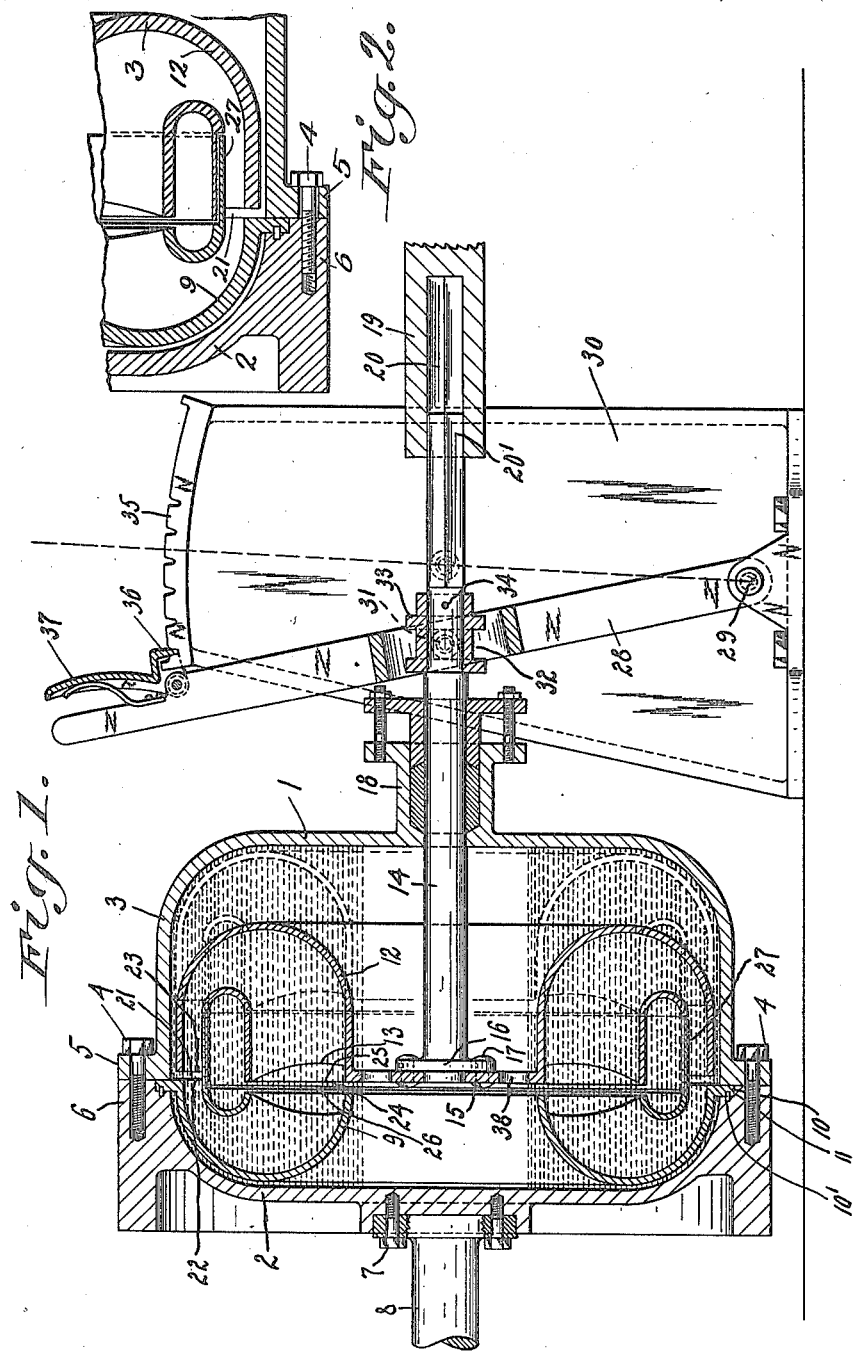

CARLTON R. RADCLIFFE, OF NEW YORK, N. Y.

HYDRAULIC POWER-TRANSMITTING APPARATUS.

1,198,150.        Specification of Letters Patent.    Patented Sept. 12, 1916.

Application filed August 18, 1915.   Serial No. 46,106.

*To all whom it may concern:*

Be it known that I, CARLTON R. RADCLIFFE, a citizen of the United States, and a resident of the city of New York, in the county of Bronx and State of New York, have invented certain new and useful Improvements in Hydraulic Power-Transmitting Apparatus, of which the following is a specification.

The present invention relates to improvements in hydraulic power transmitting apparatus of the type disclosed in U. S. Letters Patent No. 1,122,302, granted to me Dec. 29, 1914. In this patent a structure is described comprising a primary turbine wheel, in the form of a centrifugal pump impeller, and a secondary turbine wheel, said wheels, in combination with the inclosing casing, being arranged in such a manner that the energy of the liquid developed in the primary wheel is transmitted to and utilized in said secondary wheel. In combination with devices of this type there have been employed heretofore valves, gates, etc., for controlling the flow of the actuating fluid from one of said wheels to the other one in order to vary the speed and torque of the driven member. This flow controlling means is either carried by or inserted in stationary passages, complicating thus materially the structure, or it is made in the form of a ring, as in the structure disclosed by the above mentioned patent, said ring being made integral with the inclosing casing and serving to throttle the outlets of the passages in the centrifugal pump impeller. It has been found that this ring is apt under certain conditions to produce eddy currents in the actuating fluid, whereby the efficiency of the device, at times, is influenced.

The object of the present invention is to obviate these defects, that is to say to produce a hydraulic power transmitting apparatus having a simple and efficient speed and torque controlling means, which does neither complicate the structure nor interfere with the efficiency of the apparatus.

With this and other objects in view, which will more fully appear as the nature of the invention is better understood, the same consists in the combination, arrangement and construction of parts hereinafter fully described, pointed out in the appended claims and illustrated in the accompanying drawing, it being understood that many changes may be made in the size and proportion of the several parts and details of construction within the scope of the appended claims without departing from the spirit or sacrificing any of the advantages of the invention.

One of the many possible embodiments of the invention is illustrated in the accompanying drawing, in which—

Figure 1 represents a vertical section taken through a power transmitting apparatus constructed in accordance with the present invention; and Fig. 2 is a similar section taken through a detail of construction.

In the drawings, the numeral 1 indicates a closed casing, made of two halves 2 and 3, which are suitably fastened together, for instance by screw bolts 4, passing through a flange 5 on the part 3 into a heavy external ring 6 upon the part 2. This casing is attached by screws 7, or otherwise, to a driving shaft 8, for instance the crankshaft of an internal combustion engine, or other motor, the casing, by reason of its heavy ring 6, acting in such case as the fly-wheel of the engine. Within the casing is disposed a primary turbine wheel 9, in the form of a centrifugal pump impeller. This impeller may be of any suitable construction and attached to the casing in any suitable manner. For instance, in the present case it is provided upon its periphery with an annular flange 10, fitting into a recess 11 in the heavy ring 6 upon the part 2 of the casing. The flange 10 of the impeller, when in the recess 11, abuts against the flange 5 upon the part 3 of the casing. By tightening properly the screws 4, the said impeller will be rigidly connected with the casing, so that the two elements will rotate together as a whole. Dowel pins 10', seated in mortises in the flange 10 and ring 6, serve to better fasten the impeller to the casing. Juxtaposed to the impeller is within the casing a secondary turbine wheel 12, that is a turbine rotor having the usual blades 13. This turbine rotor may be also of any suitable construction. The turbine rotor is fastened to a driven shaft 14 in any suitable manner, for instance the said rotor may be provided with a web 15, abutting against a flange 16 upon the shaft 14, and through said web and flange pass fastening means, for instance in the form of rivets 17. The shaft 14 is journaled in an external bearing 18 upon the part 3 of the casing. The driven shaft is connected with a driven member 19, in which it is slidable in the direction of its longitudinal axis. The connection between the driven shaft and the driven member may be of any suitable construction, for instance there may be formed in the driven member a recess 20 of polygonal configuration, for instance of square cross section, and in this recess is seated the similarly shaped end, in this case the squared end 20' of the driven shaft.

The primary and secondary wheels are, as above described, juxtaposed to each other. There is, however, a small gap 21 left between the discharge side 22 of the primary wheel and the inlet side 23 of the secondary wheel. A small gap 24 is also left between the outlet side 25 of the secondary wheel and the inlet side 26 of the primary wheel. The purpose of this arrangement will be explained hereinafter.

Immediately below the discharge side of the primary wheel there is formed upon the latter a ring-shaped extension 27, which projects in the normal positions of the primary and secondary wheels into the latter. To allow this, obviously, in the blades of the secondary wheel there must be provided slots.

The width of the casing 1 is considerably larger than the combined widths of the two wheels therein, as appears from the drawing. The driven shaft 14 is shiftable in the direction of its longitudinal axis by means presently to be described. By shifting the secondary wheel, obviously the gaps between the two wheels are increased or decreased, as the case may be. The means for shifting the driven shaft and the turbine rotor attached thereto comprises, for instance, a lever 28, that is fulcrumed at 29 to a standard 30. This lever carries lugs 31, which are seated in the peripheral groove 32 of a collar 33, the latter being attached, for instance, by a cotter pin 34 to the driven shaft. Upon the standard 30 is formed a notched segment 35, and in the notches thereof is adapted to project the nose 36 of a spring pressed latch 37, that is pivoted to the lever 28. By means of this arrangement, the turbine rotor can be held in any predetermined position in relation to the primary wheel.

The peripheries of both the primary and secondary wheels are substantially equal to the inner diameter of the casing 1. The inner diameters of these ring-shaped wheels, however, are considerably larger than the diameter of the driven shaft. In other words, the innermost points of the circuits, in which the operating liquid flows, are disposed at a substantial distance from the driven shaft. This being the case, naturally the casing need not be filled entirely with the actuating fluid, yet the said wheels will be wholly submerged, as appears hereinafter, during the operation of the device in the actuating fluid.

The operation of this device is as follows: Let us suppose that the parts are in the positions shown in the drawing and rotation is imparted to the driving shaft 8. The working fluid is then immediately thrown by centrifugal force toward the periphery of the casing 1. Part of it flows through holes 38 in the web and enters through the gap 21 the driving and driven members, and part of it flows through the gap 24 into the said members until they are filled. The remainder is held against the inner face of the peripheral portion of the casing, and between the said inner face of the casing and the two wheels, all as clearly shown by dotted lines in the drawing. Obviously as the impeller is being rotated, the liquid therein receives energy which is transmitted to the secondary turbine wheel, through which the liquid again returns to the primary wheel. The secondary wheel is thus rotated, power being transmitted to the driven member 19. If it is intended to decrease the speed and torque of the driven member, the gap between the two turbines is increased, that is to say the secondary wheel is shifted by means of the lever 28 toward the driven member 19. The minimum speed will be obtained when the turbine rotor is in the dotted position shown in the drawing, that is to say when the gap between the two wheels is the largest. The flow of the liquid from the primary wheel to the secondary wheel is always, even when the gap is the largest, guided by the ring-shaped extension 27. As mentioned above, the speed of the turbine rotor decreases as the gap between the two wheels decreases. The reason for this is that in an increased gap the tangential velocity of the jets issuing from the primary wheel and flowing toward the secondary wheel is lessened, and naturally so is also the kinetic energy of said jets. The quantity of the liquid flowing to the secondary wheel is, however, always constant. The torque of the driven member naturally decreases in the same way as the speed thereof.

It is obvious that, while herein turbine wheels of specific construction have been described in connection with a partly filled casing, any other structures may be employed just as well without departing from the invention, which lies mainly in the provision of means for increasing the normal gap between the primary and secondary wheels of the apparatus for the purpose specified.

The combination, *per se*, of a partly filled casing with turbine wheels therein has not been claimed in this application, the structure being described and claimed in application for U. S. Letters Patent, Ser. No. 45,885, filed by me on the 17th day of Aug., 1915.

What I claim is:—

1. In a hydraulic power transmitting apparatus, the combination with a primary shaft, of a secondary shaft, means for transmitting power from said primary shaft to said secondary shaft, comprising a primary wheel and a secondary wheel juxtaposed to said primary wheel, and means for varying, at will, the gap between said two wheels.

2. In a hydraulic power transmitting apparatus, the combination with a centrifugal pump impeller, of a turbine rotor juxtaposed thereto, and means for varying, at will, the gap between said impeller and rotor.

3. In a hydraulic power transmitting apparatus, the combination with a centrifugal pump impeller, of a turbine rotor coaxially juxtaposed thereto and operated by the kinetic energy of the fluid delivered from said impeller, and means for varying, at will, the gap between said two wheels.

4. In a hydraulic power transmitting apparatus, the combination with a primary shaft, of a secondary shaft, means for transmitting power from said primary shaft to said secondary shaft, comprising a primary wheel and a secondary wheel juxtaposed to said primary wheel, and means for shifting one of said wheels in the direction of the longitudinal axis of its shaft to vary, at will, the gap between said two wheels.

5. In a hydraulic power transmitting apparatus, the combination with a primary shaft, of a secondary shaft, means for transmitting power from said primary shaft to said secondary shaft, comprising a primary wheel and a secondary wheel juxtaposed to said primary wheel, means for varying, at will, the gap between said two wheels, and means upon one of said wheels for guiding the liquid from said primary wheel to said secondary wheel in all positions of said wheels.

6. In a hydraulic power transmitting apparatus, the combination with a centrifugal pump impeller, of a turbine rotor juxtaposed thereto, means for varying, at will, the gap between said impeller and rotor, and means upon one of said wheels for guiding the liquid from said impeller to said rotor in all positions of said wheels.

7. In a hydraulic power transmitting apparatus, the combination with a centrifugal pump impeller, of a turbine rotor coaxially juxtaposed thereto and operated by the kinetic energy of the fluid delivered from said impeller, means for varying, at will, the gap between said two wheels, and means upon one of said wheels for guiding the liquid from said impeller to said rotor in all positions of said wheels.

8. In a hydraulic power transmitting apparatus, the combination with a primary shaft, of a secondary shaft, means for transmitting power from said primary shaft to said secondary shaft, comprising a primary wheel and a secondary wheel juxtaposed to said primary wheel, means for shifting one of said wheels in the direction of the longitudinal axis of its shaft to vary, at will, the gap between said two wheels, and means upon one of said wheels for guiding the liquid from said primary wheel to said secondary wheel in all positions of said wheels.

9. In a hydraulic power transmitting apparatus, the combination with a primary turbine wheel, of a secondary wheel juxtaposed thereto, a casing inclosing said wheels, and means for varying, at will, the gap between said two wheels.

10. In a hydraulic power transmitting apparatus, the combination with a primary turbine wheel, of a secondary wheel juxtaposed thereto, a casing inclosing said wheels, means for varying, at will, the gap between said two wheels, and means upon one of said wheels for guiding the liquid from said primary wheel to said secondary wheel in all positions of said wheels.

11. In a hydraulic power transmitting apparatus, the combination with a primary turbine wheel, of a secondary wheel juxtaposed thereto, a casing inclosing said wheels, and means for varying, at will, the gap between said two wheels, said primary wheel being attached to said casing.

12. In a hydraulic power transmitting apparatus, the combination with a primary turbine wheel, of a secondary wheel juxtaposed thereto, a casing inclosing said wheels, means for varying, at will, the gap between said two wheels, said primary wheel being attached to said casing, and means upon one of said wheels for guiding the liquid from said primary wheel to said secondary wheel in all positions of said wheels.

Signed at New York, in the county of New York, and State of New York, this 11th day of June, A. D. 1915.

CARLTON R. RADCLIFFE.